United States Patent [19]

Demiryont

[11] Patent Number: 5,130,841
[45] Date of Patent: Jul. 14, 1992

[54] METHOD OF MAKING AN ELECTROCHROMIC MATERIAL AND NEW ELECTROCHROMIC MATERIAL

[75] Inventor: Hulya Demiryont, Dearborn, Mich.

[73] Assignee: Ford Motor Company, Dearborn, Mich.

[21] Appl. No.: 787,702

[22] Filed: Nov. 4, 1991

Related U.S. Application Data

[63] Continuation of Ser. No. 515,536, Apr. 30, 1990, abandoned, which is a continuation of Ser. No. 179,825, Apr. 11, 1988, abandoned.

[51] Int. Cl.$^5$ .................... G02F 1/15; G02F 1/01
[52] U.S. Cl. ..................... 359/265; 359/273
[58] Field of Search ............ 350/357; 204/192.31; 252/583, 586; 359/265, 273

[56] References Cited

U.S. PATENT DOCUMENTS

| 4,645,308 | 2/1987 | Tracy et al. | 3350/357 |
| 4,960,324 | 10/1990 | Brown | 359/265 |

FOREIGN PATENT DOCUMENTS

| 0073749 | 6/1977 | Japan | 350/357 |
| 0046290 | 3/1982 | Japan | 350/357 |
| 0158834 | 9/1982 | Japan | 350/357 |
| 0209721 | 12/1983 | Japan | 350/357 |
| 59-55416 | 3/1984 | Japan | |
| 0114519 | 7/1984 | Japan | 350/357 |
| 0181732 | 9/1985 | Japan | 350/357 |

Primary Examiner—Eugene R. LaRoche
Assistant Examiner—Evelyn A. Lester
Attorney, Agent, or Firm—Charles H. Ellerbrock; Clifford L. Sadler

[57] ABSTRACT

This specification discloses vanadium oxide reduced by a codeposited reducing agent as an electrochromic material. The reducing agent may be a metal or a nonstoichiometric metal oxide. Preferred metals disclosed are vanadium and gold. Preferred metal oxides disclosed are nonstoichiometric lead oxide and nonstoichiometric bismuth oxide. The specification also discloses a method of making a nonelectrochromic, fully oxidized vanadium oxide [$V_2O_5$] into an electrochromic material. The method includes the step of codepositing the fully oxidized vanadium oxide on a support for an electrochromic device along with a material which reduces the fully oxidized vanadium oxide to a less than fully oxidized state in which the reduced vanadium oxide is electrochromic.

10 Claims, No Drawings

METHOD OF MAKING AN ELECTROCHROMIC MATERIAL AND NEW ELECTROCHROMIC MATERIAL

This is a continuation of copending application Ser. No. 07/515,536 filed on Apr. 30, 1990, which was a continuation of application Ser. No. 07/179,825 filed on Apr. 11, 1988, now abandoned.

BACKGROUND OF THE INVENTION

1. Field of the Invention

This invention relates to a method of making an enhanced electrochromic material and a new enhanced electrochromic material.

2. Description of the Related Art

In order for the reader to obtain a thorough understanding of electrochromic behavior in electrochromic materials, the reader is referred to my U.S. Pat. application entitled "New Electrochromic Device and Method of Making an Electrochromic Layer Therefor" which was filed on Dec. 24, 1987 and given U.S. Ser. No. 137,631. Since that application has a thorough discussion of electrochromic behavior in electrochromic materials, no further discussion of that subject matter will be undertaken herein.

From my reading of the literature available in this area, I knew vanadium oxide was reported as an electrochromic material. Those that reported on this electrochromic material, indicated that the electrochromic material was fully oxidized vanadium oxide [$V_2O_5$]. The reader is referred to both a review article entitled: "Transition Metal Oxides, Electrochromic Materials and Displays" by W. C. Dantremont-Smith and U.S. Pat. No. 4,645,308 in which such a position is set forth.

Thus, as I began my work in the area of electrochromic materials, I believed that fully oxidized vanadium oxide was an electrochromic material. However, as I carried out studies in this area, I became aware that, in fact, fully oxidized vanadium oxide [$V_2O_5$] is not a good electrochromic material.

My studies in this area have indicated that the oxide of vanadium exhibiting electrochromic properties is $VO_x$ with x being less than 2.5. When the value of x decreases from 2.5 to about 2, electrochromically induced color follows the following order: light greenish—blue —dark blue—black. Oxygen deficiency beyond about $VO_2$ destroys the reversible electrochromic properties of the material.

When I conducted experiments utilizing fully oxidized vanadium oxide, I could not get good electrochromic properties therefrom. However, when I conducted experiments utilizing vanadium oxide in a reduced state, I achieved enhanced electrochromic properties therefrom.

It is an object of this invention to provide as an enhanced electrochromic material vanadium oxide which has a controlled state of reduction.

It is a feature of this invention that vanadium oxide is provided in a controlled oxidized state as an electrochromic material.

It is an advantage of this invention that the state of oxidation of vanadium oxide can be controlled so that the best electrochromic properties may be achieved therefrom.

It is another object of this invention to provide a method of making vanadium oxide in a reduced state so that it is an enhanced electrochromic material.

It is another feature of this invention to provide a method of making a reduced vanadium oxide so that enhanced electrochromic properties may be achieved therefrom.

It is another advantage of this invention that a method is provided for making vanadium oxide in a reduced state so that selected electrochromic characteristics may be achieved therefrom.

DISCLOSURE OF THE INVENTION

This invention is directed to an enhanced electrochromic material. The enhanced electrochromic material is vanadium oxide reduced by a codeposited reducing agent. The reduced vanadium oxide has a formula $VO_x$ where x is less than 2.5. Preferably the vanadium oxide has a formula of no less than about $VO_2$. The reducing agent can be a metal or a metal oxide. Preferred metals which act as a reducing agent are vanadium and gold. Preferred reducing agents which are metal oxides are not fully oxidized, that is nonstoichiometric, lead oxide and not fully oxidized, that is nonstoichiometric, bismuth oxide.

A method of making fully oxidized vanadium oxide [$V_2O_5$] into an enhanced electrochromic material is taught. This method comprises the step of codepositing the fully oxodized vanadium oxide on a support for an electrochromic device along with a material which reduces the fully oxidized vanadium oxide to a less than fully oxidized state in which the reduced vanadium oxide has superior electrochromic properties. The reducing agent may be a metal or a metal oxide. Preferred metals are vanadium and gold. Preferred metal oxides which act as a reducing agent are nonstoichiometric lead oxide and nonstoichiometric bismuth oxide.

In a preferred embodiment the method is carried out in a manner that a material which reduces the fully oxidized vanadium oxide to a less fully oxidized state is present on a support for an electrochromic device no more than about 10%, preferably 3 to 7%, by weight of the vanadium oxide present on the support.

DESCRIPTION OF THE PREFERRED EMBODIMENTS

The novel features that are considered characteristic of the invention are set forth with particularity in the appended claims. The invention itself, however, both as to its organization and its method of operation, together with additional objects, features and advantages thereof, will best be understood from the following description of specific embodiments.

The following description is what I consider to be the preferred embodiments of my invention. The following description also sets forth what I now contemplate to be the best mode of making the electrochromic material of my invention. The description is not intended to be a limitation upon the broader principles of this invention.

While it has been generally reported in the literature that fully oxidized vanadium oxide is an electrochromic material, I have discovered that, in fact, fully oxidized vanadium oxide [$V_2O_5$] is not a good electrochromic material. I have discovered that vanadium oxide exhibiting enhanced electrochromism is a vanadium oxide [$VO_x$] in which x is less than 2.5. I have discovered that the optical efficiency of $VO_x$ films depends on the value of x. I achieved a controlled reduced oxide state of vanadium oxide by codepositing with the vanadium oxide on a support for an electrochromic material a suitable reducing agent. When such is carried out and a reduced vanadium oxide layer of about 500 nm thickness is provided with x equaling 2.2 in its colored state, the film is nontransparent in the visible and infrared regions.

In accordance with the teachings of my invention, reduced vanadium oxide [$VO_x$] is obtained by codepositing, with a fully oxidized vanadium oxide on a support for an electrochromic device, a reducing agent. I have discovered that suitable reducing agents include both metals and metal oxides. Preferred metals are vanadium and gold. Preferred metal oxides are nonstoichiometric lead oxide and nonstoichiometric bismuth oxide.

The invention discloses a method of making a fully oxidized vanadium oxide [$V_2O_5$] into an enhanced electrochromic material. The method is accomplished by the step of codepositing the fully oxidized vanadium oxide on a support for an electrochromic device along with a material which reduces the fully oxidized vanadium oxide. The fully oxidized vanadium oxide is reduced to a less than fully oxidized state in which the reduced vanadium oxide has superior electrochromic properties.

Preferably, the above-described method is carried out in such a manner that the material which reduces the fully oxidized vanadium oxide is present on the support for the electrochromic device no greater than about 10% by weight of the vanadium oxide present. I have found, generally, that the best electrochromic properties are obtained when the reducing agent is present in the final film in a range from about 3 to 7 by weight of the vanadium oxide. Characteristics of the enhanced electrochromic film are, of course, controlled by the reducing agent present and the amount in which it is present. Such characteristics as memory (duration of coloring) and color of electrochromic response depend on these variables. The type and amount of reducing agent present also controls the degree to which the previously fully oxidized vanadium oxide is reduced.

EXAMPLE I

An electrochromic film was deposited on a suitable transparent electrode by a thermal evaporation process. A premixture of fully oxidized vanadium oxide and stoichiometric lead oxide powders were premixed with one another and placed in a tantalum boat. The tantalum boat was preheated in a suitable vacuum chamber. A predeposition process consisted of heating the tantalum boat to a temperature just below the evaporation temperature thereof for about 30 minutes at $10^{-5}$ torr vacuum. This processing lead to the decomposition of the stoichiometric lead oxide into a nonstoichiometric lead oxide.

A transparent electrode was positioned about 10 cm from the tantalum boat. The temperature of the tantalum boat was raised and a flash evaporation carried out to deposit an enhanced electrochromic film on the transparent electrode having about 10% by weight of the film being nonstoichiometric lead oxide, the remainder being formed by vanadium oxide in a reduced state because of the decomposition of the lead oxide during the predeposition process.

The enhanced electrochromic film was built up at a rate of about 200 A° per minute to a total thickness of about 4,500 A°. An electrochromic device was completed by utilizing another transparent electrode and a source of fast ions.

The fast ion conductor was LiCl doped (0.5%) polyvinylbutyral (PVB) dissolved with methanol. The viscos solution was used to form an electrochromic device with the following order—glass/ transparent electrode/ $VO_x$/ PVB : LiCl/ transparent electrode/ glass. A+/−3 volts was applied to the electrochromic device. When the electrode next to the $VO_x$ was negative, the device was colored. When the electrode next to the $VO_x$ was positive, the device was bleached.

EXAMPLE II

The procedure of Example I was repeated, except that the enhanced electrochromic film contained about 5% by weight of the lead oxide reducing agent. In this case, when an enhanced electrochromic device was constructed with this electrochromic material, it switched from a yellow state to a blue state. The bleached state color of the sample is yellow due to the existance of component $V_2O_5$ component within the sample (See Example III).

EXAMPLE III

The procedure of Example I was repeated, except that the electrochromic film did not contain a reducing agent. In this case, when the electrochromic device was constructed with $V_2O_5$ electrochromic material, the device did not switch when a field was applied in the manner of Example I. The material stayed in a yellow colored state.

EXAMPLE IV

An enhanced electrochromic film was deposited on a transparent electrode by thermal evaporation in a manner similar to that described in Example I. In this situation, however, the material mixed and contained in the tantalum boat was a mixture of fully oxidized vanadium and a stoichiometric bismuth oxide.

The same preheating process was applied as in Example I. The source to substrate distance was 10 cm and the evaporation rate was about 200 A° per minute. The enhanced electrochromic film was deposited to a thickness of about 4,500 A°.

The deposited film was then formed into an electrochromic device by utilization of a second transparent electrode and a suitable fast ion conductor material. The electrochromic device so-formed had a concentration of about 10% by weight of the nonstoichiometric bismuth oxide in the enhanced electrochromic layer. This material is effective to reduce the fully oxidized vanadium oxide to a less than fully oxidized state in which the reduced vanadium oxide has superior electrochromic properties.

When bismuth oxide was used as the reducing material at this level, the electrochromic device switched from a light greenish color to a blue color.

EXAMPLE V

The procedure of Example IV was repeated in detail, except that the enhanced electrochromic film had a concentration of about 5% by weight of the not fully oxidized bismuth oxide therein. In this case, when a switching voltage of plus or minus five volts was applied the device switched from a bleached state to a blue color.

While examples of the codeposition of a metal oxide with vanadium oxide have been described above, one may also utilize a metal as the reducing agent. In particular, good metals which may be used are vanadium and gold.

If one uses gold as the reducing agent, then the enhanced electrochromic reduced vanadium oxide formed thereby is one which will not, over a prolonged period of time, be oxidized back to its fully oxidized nonelectrochromic state.

While particular embodiments of the invention have been illustrated and described, it will be obvious to those skilled in the art that various changes and modifications may be made without departing from the invention. It is intended to cover in the appended claims all such modifications and equivalents as fall within the true spirit and scope of this invention.

I claim:

1. An enhanced electrochromic material, comprising reduced vanadium oxide and a non-stoichiometric metal oxide, said reduced vanadium oxide having a formula $VO_x$ wherein $x$ is less than 2.5, said non-stoichiometric metal oxide being present in said enhanced electrochromic material at a concentration up to about 10% by weight of said reduced vanadium oxide.

2. The enhanced electrochrommic material of claim 1, wherein said reduced vanadium oxide has a formula $VO_{2.2}$.

3. The enhanced electrochromic material of claim 1, wherein said non-stoichiometric metal oxide is a non-stoichiometric lead oxide.

4. The enhanced electrochromic material of claim 1, wherein said non-stoichiometric metal oxide is a non-stoichiometric bismuth oxide.

5. The enhanced electrochromic material of claim 1, wherein said non-stoichiometric metal oxide is present in said enhanced electrochromic material at a concentration of about 3% to about 7% by weight of said reduced vanadium oxide.

6. An electrochromic device, including the enhanced electrochromic material of claim 1.

7. A method for preparing reduced vanadium oxide, useful as an enhanced electrochromic material, comprising the steps of:
   vaporizing a mixture comprising fully oxidized vanadium oxide and a non-stoichiometric metal oxide; and
   codepositing said mixture onto a support for an electrochromic device to form a layer of said reduced vanadium oxide containing said non-stoichiometric metal oxide on said support, said non-stoichiometric metal oxide being present in said enhanced electrochromic material at a concentration up to about 10% by weight of said reduced vanadium oxide.

8. The method of claim 7, wherein said non-stoichiometric metal oxide is a non-stoichiometric lead oxide.

9. The method of claim 7, wherein said non-stoichiometric metal oxide is a non-stoichiometric bismuth oxide.

10. The method of claim 7, wherein said non-stoichiometric metal oxide is present in said enhanced electrochromic material at a concentration of about 3% to about 7% by weight of said reduced vanadium oxide.

* * * * *